United States Patent Office 2,839,165
Patented June 17, 1958

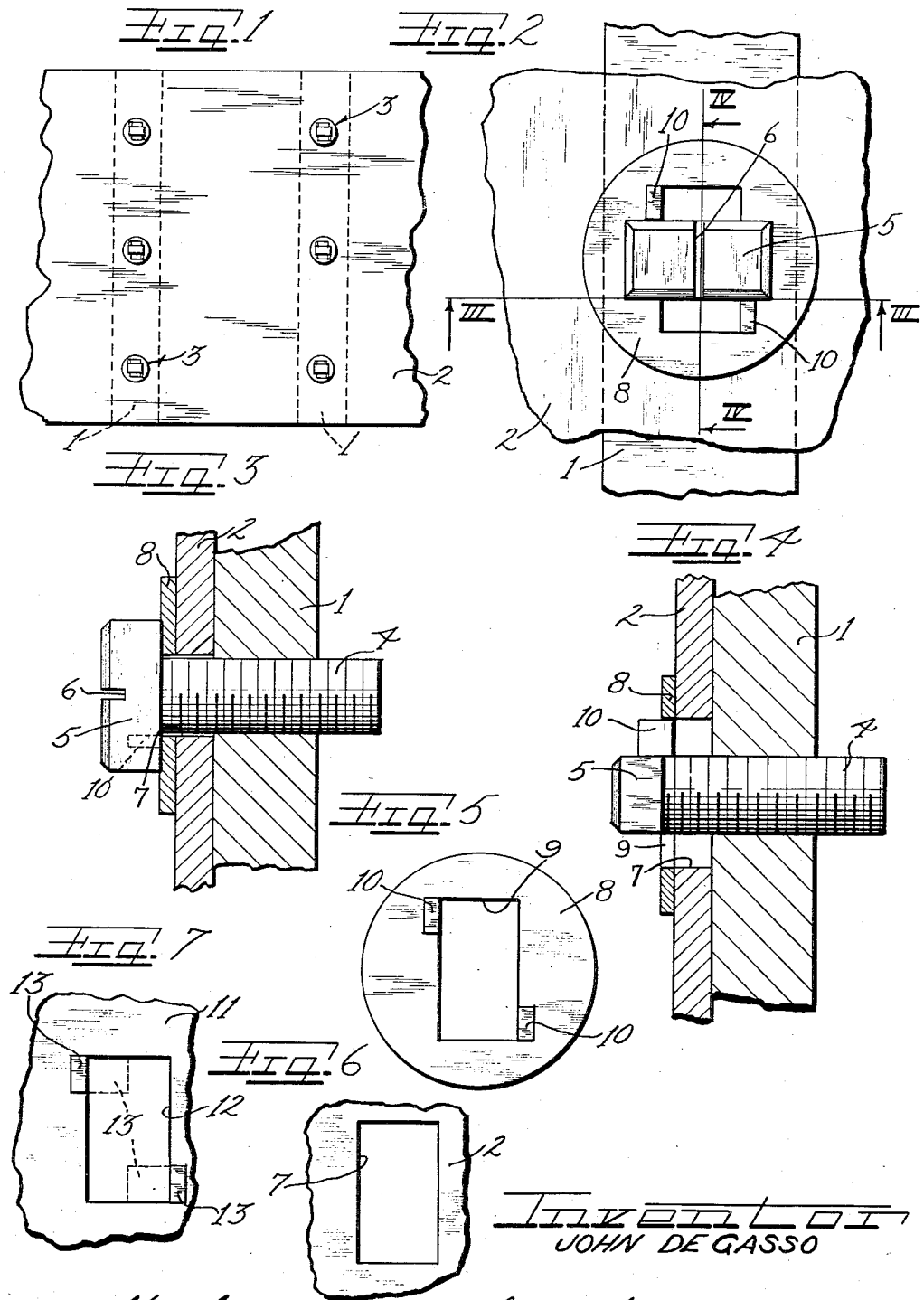

2,839,165

QUICK RELEASE FASTENING

John De Gasso, Chicago, Ill.

Application November 16, 1954, Serial No. 469,100

4 Claims. (Cl. 189—36)

This invention relates to improvements in a quick release fastening, and more particularly to a quick release fastening assembly highly desirable for connecting a bar, plate, or the like, to a supporting member, the invention being especially suitable for the temporary connection of various elements such as tools, jigs, the installation of concrete forms for quick assembly and ready removal, and numerous other temporary connections of various and sundry devices, as will be apparent to one skilled in the art.

In the past, many and various types of quick release fastening assemblies have been developed, but in most cases these formerly known arrangements required the use of special tools in order to effect a tightening or release of the fastening means, and an objectionable amount of time was consumed in a prolonged operation to either secure or release the respective elements. In addition, many of these formerly known assemblies were such that the assembly was mounted to one side of one of the pieces being connected, and it is frequently necessary to connect the piece in an intermediate location where a side mounted element will not reach the securement point. In addition, it may be mentioned that these formerly known assemblies were in every instance of which I am aware objectionably complicated and expensive to manufacture and use, as well as maintain in proper position between jobs.

With the foregoing in mind, it is an important object of the instant invention to provide a quick release fastening assembly distinguished by its utter simplicity in operation.

Another object of the invention is the provision of quick release fastening means whereby one part may be temporarily but securely connected to another part at an intermediate point or in substantially any desired location and equally as readily removed.

A further feature of the invention resides in the provision of a quick release fastening assembly in which one part may readily slide over the fastening element, and then it is only necessary to rotate the fastening element a partial revolution in order to effect positive securement.

It is also a feature of the invention to provide a quick release fastening assembly which is readily moved into securement position and equally as readily moved into release position without requiring the use of any tools in most instances, and no more than the commonly known screwdriver in any instance.

A further object of the invention resides in the provision of a quick release fastening assembly whereby the element to be secured to the supporting member carries stop means which limits the rotation of the fastening element thereby facilitating rapidity of operation in that the stop means insures movement to proper securing position and not beyond.

Also an object of the invention is the provision of a quick release fastening assembly embodying a holding element carried by the supporting member, said holding element having a head projecting farther in one direction than another, with the supported member having an aperture designed to slip over said head, and then a simple partial revolution of the head is sufficient to lock over the supported piece and effect the desired engagement.

Still a further object of the instant invention resides in the provision of a quick release fastening assembly wherein the supporting member carries a bolt having an elongated head, and the supported member is apertured complementally to the head to slip over the head, and a simple partial revolution of the head causes a positive overlapping of the supported member by the head to effect a positive securement.

While some of the more salient features, characteristics and advantages of the instant invention have been above pointed out, others will become apparent from the following disclosures, taken in conjunction with the accompanying drawing, in which—

Figure 1 is a fragmentary elevational view of a plate-like member connected to supporting means by fastening assemblies embodying principles of the instant invention;

Figure 2 is a fragmentary elevational view of one of the assemblies of Fig. 1, greatly enlarged;

Figure 3 is a fragmentary bottom plan sectional view taken substantially as indicated by the line III—III of Fig. 2, looking in the direction of the arrows, the entire figure being rotated to facilitate illustration;

Figure 4 is an enlarged fragmentary vertical sectional view taken substantially as indicated by the line IV—IV of Fig. 2, the bolt being shown in elevation;

Figure 5 is a front view of an element carried by the supported member;

Figure 6 is a fragmentary elevational view of a portion of the carried member; and Figure 7 is a fragmentary elevational view of a supported member, showing a slightly different form of construction.

As shown on the drawings:

It will be understood that while in the illustrated showing, the instant invention shows a plate-like member secured to spaced supporting bars or rails, with the entire structure shown in substantially vertical position, that the invention is adaptable for the securement of many and various forms of parts, one to the other, and the parts may be disposed in substantially any desirable position.

The illustrated embodiment of the invention discloses a structure that may be utilized to provide a temporary enclosure, a scaffolding, concrete form arrangements, and the like.

With reference now to Figs. 1 to 4 inclusive, it will be seen that a plurality of supporting members 1 in the form of elongated bars are utilized to temporarily carry a plate 2. The securement of the plate to the bars is accomplished by a plurality of quick release fastening assemblies generally indicated in Fig. 1 by numeral 3. It will be noted that the fastening assemblies anchor the plate to the base members or supports 1 at various intermediate locations in the plate.

Each of the fastening assemblies includes a bolt 4 threaded into the base or supporting member 1. This bolt is provided with a head 5 which is preferably longer in one direction than another, projects farther in one direction than any other direction, or has a shape other than round. In the illustrated instance the head 5 is rectangular which is a simple and economical form of construction. Preferably the head 5 is provided with a center slot 6 to accommodate a screwdriver or similar implement.

With reference now to Fig. 6 it will be seen that the plate 2 is provided with an aperture 7 of similar configuration to the bolt head 5, and just sufficiently larger than the bolt head to pass easily thereover.

Fixedly secured to the plate 2 around the aperture 7 is a washer 8, having an aperture 9 therein of the same shape and size as the aperture 7 in the plate, as clearly seen in Fig. 5. This washer may be secured to the plate in any suitable manner, such as by brazing or welding, and the washer is utilized when the plate is of substantial thickness, exceeding 1/8 inch or thereabouts, or when the plate or supported member is made of some other material than metal or easily bendable material. In stamping out the washer, tongues or lugs 10 are left projecting into the aperture, and then are bent at right angles to the washer as seen best in Figs. 4 and 5. The tongues 10—10, if two are utilized, are on opposite sides of the aperture, and preferably adjacent the ends of the aperture, the tongues being separated longitudinally of the aperture by a distance slightly greater than the width of the bolt head 5. These lugs 10 function as stop elements in the operation of the structure. In effecting the temporary securement of the supported member or plate 2 to the base or supporting member 1, it is a simple expedient to turn down the bolt into the base member 1 until the head projects from the base member a distance substantially equal to the combined thickness of the plate 2 and washer 8. The plate 2 carrying the washer 8, is then slipped over the bolt head, which at that particular time is at right angles to the position seen in Figs. 2, 3 and 4. After the apertures in the plate and washer have passed over the bolt head, it is a very simple expedient to rotate the bolt head substantially 90° toward tightening position, until the bolt head contacts the stop members 10—10, and the parts are effectively locked in position. As seen clearly in Fig. 2, in this position the bolt head overlies the outer face of the washer and holds the plate joined to the supporting member 1. Such turning of the bolt head in many cases may be effected by the hands only of the operator, but if more than manual strength is required, a screwdriver or similar instrument may be inserted in the slot 6 in the bolt head to effect the necessary movement of that head through a partial revolution.

When it is desired to release the parts, it is a simple expedient to rotate the bolt head a partial revolution in the reverse direction, until it again contacts the stops 10—10, and then the plate and washer may be lifted off the bolt head. After separation of the parts, and when they are to be transported to a new location for further use, or stored, the bolt remains in the supporting member 1, and there are no parts to become lost, strayed, or mislaid. It will be particularly noted that the operation is extremely simple and may be accomplished in a minimum length of time with a minimum of effort. Further, the connections may be made in locations difficult of access and substantially devoid of adequate illumination, since the plate may be passed over the bolt head by feel, the stop members indicate when the bolt head has been turned a proper amount. It will also be noted that the structure is extremely durable, very simple in operation, and economical to manufacture and use.

In Fig. 7 I have illustrated a slightly different form of structure wherein the element to be supported, such as the plate 2, is relatively thin and made of bendable material. In this instance, the supported member 11 is provided with a suitable aperture 12 for passage over the bolt head, and when this aperture is cut stop members or lugs 13 are provided directly in the member 11 itself, initially in the dotted line positions seen in this figure, and then bent upwardly to the full line positions to function as stop members for the bolt head. This eliminates the necessity of attaching a washer of similar construction to the supported member, and is a desirable and efficient construction when that member is sufficiently thin and made of bendable material.

It will be understood that modifications and variations may be effected without departing from the scope of the novel concepts of the present invention.

I claim as my invention:

1. A quick release fastening assembly, including a base member having a threaded opening, a bolt with a transversely elongated head threaded in said opening, a plate having an elongated aperture therein to fit over the head of said bolt, a washer secured to said plate and having a similar aperture in alignment with the plate aperture, and upstanding lugs on the washer at opposite sides of its aperture near the ends of the aperture to limit movement of the bolt head.

2. A quick release fastening assembly, including a base member, a bolt threadedly engaged in said base member, a head on said bolt having long and short axes, a member to be connected to said base member and having a similarly shaped aperture therein to pass over the bolt head when in alignment therewith, said members being incapable of relative turning movement and the bolt being initially threaded into the base member to within 90° of tightening relation of said bolt head to said member to be connected, and outwardly projecting means carried by the second said member to limit tightening rotation of said bolt to substantially a 90° movement to bring the long axis of the bolt head transverse to the long axis of the aperture in the second said member, said head being shaped for engagement by a hand tool to manipulate the same to secure and release said member.

3. A quick release fastening assembly, including a support, a bolt rotatably carried by said support, a transversely elongated head on said bolt, a member having an aperture therein of the same contour as the bolt head to pass over the bolt head and be secured to said support when the bolt is turned to bring the projecting portion over a solid part of said member, and a washer interposed between said bolt head and said member and having therein a matching aperture, the washer having an outwardly extending stop element to limit the turning movement of the bolt relative to the washer in a tightening direction with the projecting portion of the bolt over a solid part of the washer.

4. A quick release fastening assembly, including a support, a rotary holding element carried by said support, said holding element having a rectangular head, a member to be removably secured to said support and having a rectangular aperture therein to pass over said head, a washer secured to said member and having a similar aperture in alignment with that of said member, and upstanding lugs on said washer on opposite sides of the aperture therein to limit rotation of said head to holding position.

References Cited in the file of this patent

UNITED STATES PATENTS

| | | |
|---|---|---|
| 481,566 | Hunter | Aug. 30, 1892 |
| 1,577,193 | Reed | Mar. 6, 1926 |

FOREIGN PATENTS

| | | |
|---|---|---|
| 2,724 | Great Britain | 1908 |